Oct. 22, 1957     A. W. WOODWARD     2,810,419
WHEEL STRUCTURE

Filed June 27, 1955     2 Sheets-Sheet 1

INVENTOR.
ALVA W. WOODWARD
BY
*R. L. Miller*
ATTORNEY

*INVENTOR.*
ALVA W. WOODWARD
BY
*P. L. Miller*
ATTORNEY

United States Patent Office 2,810,419
Patented Oct. 22, 1957

2,810,419
WHEEL STRUCTURE

Alva W. Woodward, Kent, Ohio, assignor to The Goodyear Tire & Rubber Company, Akron, Ohio, a corporation of Ohio Application June 27, 1955, Serial No. 518,237

4 Claims. (Cl. 152—410)

This invention relates to a wheel structure and more particularly to a wheel structure for use with tubeless tires.

The use of tubeless tires has become more and more prevalent and will, no doubt, in the near future, become universal for all new vehicles. For all wheel and rim structures except the drop center rim and wheel use on passenger cars, various problems are encountered in converting the structures for use with tubeless tires. Much work has been done along this line in order to provide rim and wheel structures that not only provide an airtight assembly but are also interchangeable with the present structures. A particularly troublesome structure has been the disc wheel and rim assembly in which a portion of the rim is welded or riveted to the wheel portion. It is very difficult to make a riveted or welded joint airtight with mass production techniques, particularly at a reasonable cost. As a result, a practical solution is to provide seal means between the air chamber of the tire and the rim attachment. Disc wheels of this type are not for heavy duty service and only a portion of the rim is removed when mounting or dismounting a tire. It is therefore an object of this invention to provide an economical disc wheel construction for use with tubeless tires.

Another object of the invention is to provide a wheel and rim that is interchangeable with the present wheel assemblies.

A further object of the invention is to provide a wheel and rim structure that does not require an airtight joint between the rim and wheel.

A still further object of the invention is to provide a rim and wheel structure that may be formed of rolled or formed steel section rather than castings.

Other objects and advantages of this invention will become apparent hereinafter as the description thereof proceeds, the novel features, arrangements and combinations being clearly pointed out in this specification, as well as the claims thereunto appended.

Figure 1:
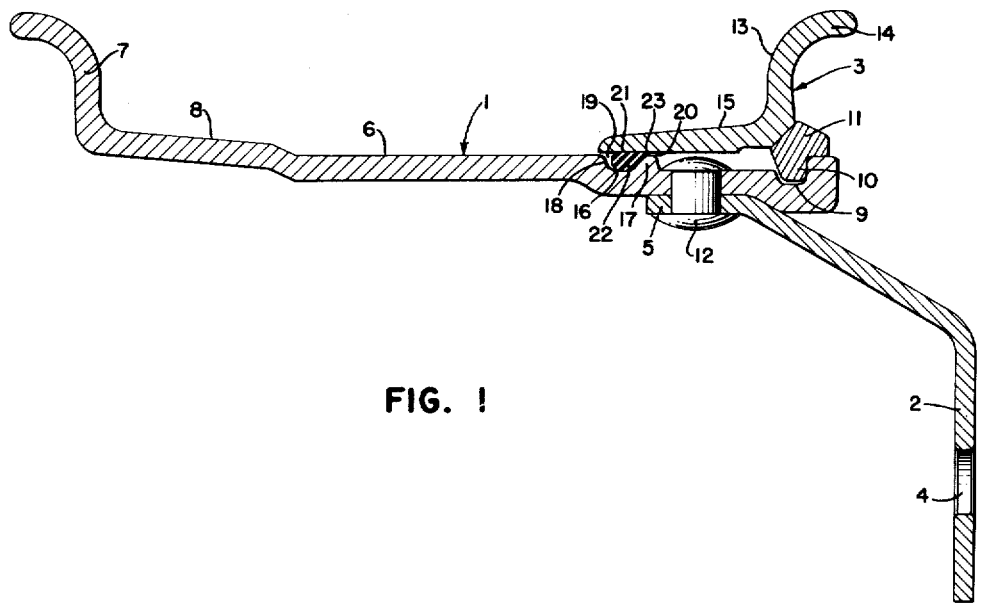
Figure 1 is a cross section view of a wheel embodying the invention.

In Figure 1, a wheel comprising a rim assembly 1, a disc 2 and removable tire mounting means 3 is illustrated.

The load bearing disc 2 is a formed metal member of the configuration shown having a central opening (not shown) through which the hub or the axle passes. At spaced intervals around the disc adjacent the opening are a series of bolt openings 4 which receive bolts or cap screws for demountably attaching the disc 2 to a wheel. The outer periphery of the disc includes an axially turned portion 5 to which the rim 1 is attached.

The rim assembly 1 comprises a generally axially extending endless cylindrical rim 6 having an integral bead retaining flange 7 and bead seat portion 8 formed along one edge. Along the opposite edge of the rim base 6 is formed an outwardly facing gutter edge or channel 9 adapted to receive the leg 10 of the split locking ring 11. The portion of the rim base 6 between the gutter edge 9 and the bead seat 8 as well as the gutter edge portion 9 is of less diameter than the bead seat 8. The rim base 6 adjacent the gutter 9 is fastened as shown to the axial portion 5 of the disc 2 by rivets 12 at spaced intervals about the periphery. Other means may be used to fasten the rim base 6 to the disc 2 such as bolts and nuts, welding, etc.

An endless side flange ring 13 having a retaining flange 14 and bead seat portion 15 is held in position on the rim base 6 by the split locking ring 11 similar to conventional rim structure. The bead seat portion overlies a portion of the rim base 6 and this portion faces toward the bead seat 8 of the rim base 6.

In order to prevent air from escaping between the rim parts when a tubeless tire is mounted thereon an outwardly facing circumferential channel 16 is formed in the rim base 6 adjacent the rivets 12 defined by the upstanding leg 17 on one side and the shoulder 18 of the rim member 6 on the other. The channel 16 lies under the axial inner end of the bead seat portion 15 of the side ring 13 to form a seal retaining chamber 19. The clearance 20 between the radial inner surface 21 of the side ring 13 and the leg 17 is provided so that the seal retaining chamber is open on one side to permit distortion of the sealing element 22 therein so as to effectively seal the rim structure.

The sealing element 22 preferably in the form of an annulus and of a resilient deformable material such as rubber or plastic is positioned in the chamber 19 and is distorted by the bead seat portion 15 of the side ring 13 as the rim is assembled. As the side ring 13 moves to its assembled position in engagement with the lock ring 11, the sealing element 22 is distorted under radial compression so that a portion 23 occupies some of the space between the surface of the leg 17 of the rim base 6 and the radial inner surface 21 of the bead seat portion 15 of the side ring 13. In this manner a positive and permanent seal is effected to prevent the escape of air pressure between the various rim parts or around the means attaching the rim to the wheel disc.

Figure 2:
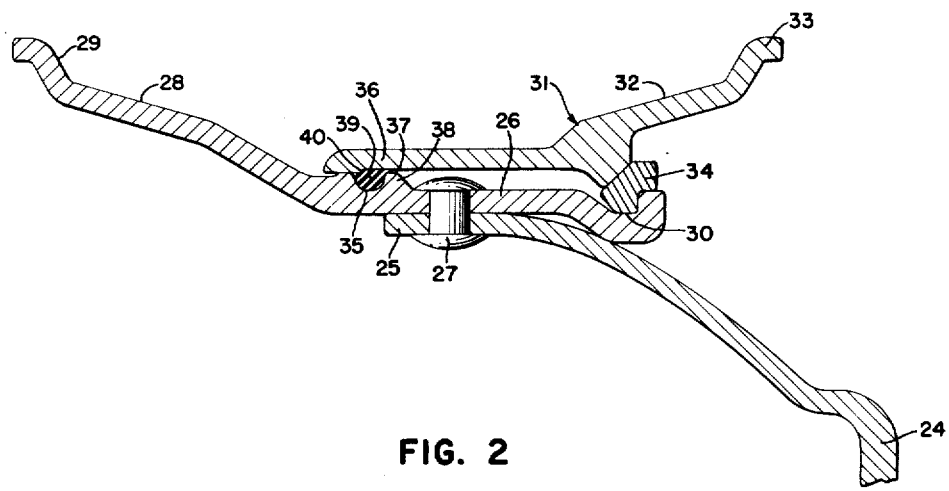
Figure 2 is a cross-sectional view of a modification of the invention.

In Figure 2, the wheel disc 24 of a different contour than that of the disc 2 in Figure 1 has an axially extending cylindrical portion 25. The rim base 26 is attached to the portion 25 by circumferentially spaced rivets 27 in the usual manner.

The rim base 26 includes a bead seat 28 and flange 29 along one edge and a gutter edge 30 along the opposite edge. To complete the rim, an endless side ring 31 having bead seat 32 and retaining flange 33 portions overlies the gutter edge 30 and a portion of the rim base 26 and is held in position by the split locking ring 34 which engages the gutter edge 30.

A seal retaining channel 35 is formed in the rim base 26 and forms, with the axially extending portion 36 of the side ring 31, a seal retaining chamber. The chamber includes an opening 37 between the radial inner face of the side ring 31 and the outer surface of the portion 38 of the rim base 26 to permit a portion of the sealing element 39 to extend therein when distorted. An axially outwardly facing shoulder 40 on the radial inner periphery of the side ring 31 lies over the channel 35 in the assembled position and assists in distorting the seal during assembly of the rim to assure a positive seal.

The sealing element 39 is similar to that described in connection with the rim structure illustrated in Figure 1.

Figure 3:
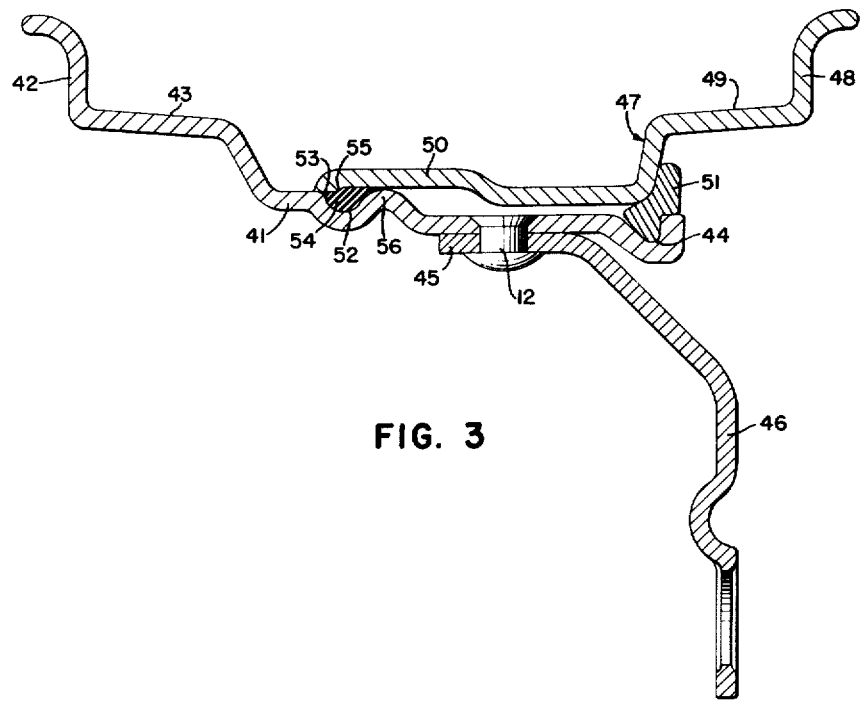
Figure 3 is a cross-sectional view of another modification of the invention.

In the modification shown in Figure 3, the rim base 41 is formed from strip steel to include a retaining flange 42 and bead seat 43 along one edge and a gutter edge 44 along the opposite edge. The base 41 is riveted to the axially extending portion 45 of the wheel 46.

The side ring 47 includes a retaining flange 48, bead seat 49 and an axially extending portion 50 overlying the rim base 41. A split locking ring 51 engages the gutter 44 and side ring 47 to position the side ring 47 with respect to the base 41.

A radially outwardly facing groove 52 is formed in the rim base 41 to form with the portion 50 a chamber 53 adapted to receive a sealing element 54 similar to those previously described. As shown the radial inner surface of the portion 50 of the side ring 47 is shaped to form an axially outwardly facing shoulder 55 to distort the sealing element 54 when the rim is assembled. A clearance is provided between the portion 56 of the rim base 41 and the portion 50 of the side ring 47 so that the distorted sealing element 54 may extend therebetween.

Figure 4:
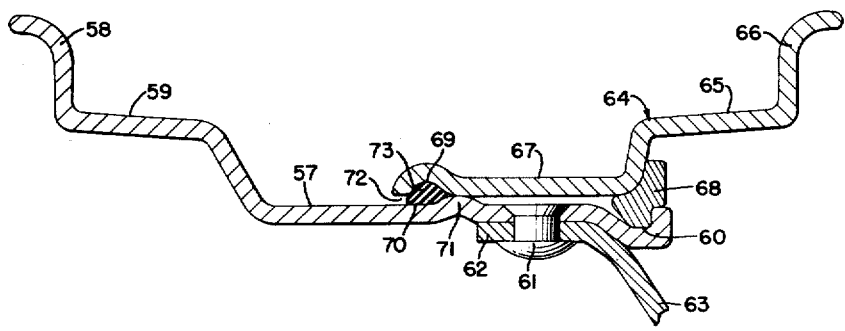
Figure 4 is a cross-sectional view of a still further modification of the invention.

Figure 4, another modification of a rim formed from strip steel is illustrated. The rim base 57 includes a retaining flange 58 and bead seat 59 along one edge with a gutter 60 along the other edge. The base 57 as illustrated is attached by rivets 61 to the axially extending portion 62 of the wheel 63.

The side ring 64 having a bead seat 65 and retaining flange 66, includes an axially extending portion 67 which overlies the base 57. The side ring 64 is held in position on the rim base 57 by the split locking ring 68 which engages the gutter 60. At the axial inner end of the portion 67 a radially inwardly facing groove 69 is formed which cooperates with the base to form a seal retaining chamber 70. The side ring 64 immediately adjacent the groove 69 engages the base 57 on the surface of a hump 71 formed therein to support the portion 67 of the side ring 64. A slight clearance 72 is provided between the inner end of the side ring 64 and the base 57.

The sealing element 73 is similar to those previously described and is distorted under radial compression when the rim is assembled. The distorted sealing element provides an effective seal between the parts of the rim structure to prevent the escape of air therethrough or around the rivets 61.

The sealing elements used with each of the forms of the wheel structures shown are preferably in the form of an annulus and of a diameter slightly less than that of the chamber into which they are mounted. This requires that they be under slight tension when they are positioned on the rim base so that they will hug the base and eliminate any possibility of being pinched or lacerated during the assembly of the rim. The cross-section of the sealing elements may be of any desired configuration but should be such that there will be sufficient distortion by assembly to provide a good seal. A round cross section of a diameter slightly larger than the heighth of the chamber has been found to provide a satisfactory seal.

It is believed that the manner of assembling any of the rim structures is obvious from the foregoing descriptions. However, briefly, to assemble the rim as illustrated in Figure 1, the lock ring 11 and side ring 13 are removed from the base 6 and a tire is placed on the rim base. The side ring 13 is then moved laterally onto the base 6 with the beads of the tire yielding inwardly toward each other until the seal retaining groove 16 is exposed. The seal 22 is then placed in the groove. The split locking ring 11 is then moved over and snapped into position in the gutter 9. The tire is then inflated through a valve in the rim base (not shown) causing the beads to move outwardly onto their respective seats and in so doing, the side ring 13 is moved laterally outwardly over the base until it engages the split locking ring 11. As it moves out into the final position, the sealing element 22 is radially compressed to form a permanent effective airtight seal so that the air pressure cannot escape between the joints between parts of the rim or around the rivets 12 attaching the rim base to the disc 2.

To assemble the rim structure illustrated in Figs. 2 and 3, first the sealing element 39 or 54 is placed in the groove 35 or 52 then the tire is placed on the rim base 26 or 41. Preferably soap solution or a similar lubricant is placed on the sealing element 39 or 54 before the tire is placed on the assembly of the rim. The side ring 31 or 47 is moved laterally onto the rim base 26 or 41 so that the gutter 30 or 44 is exposed so that the split locking ring 34 or 51 can be positioned therein. In this position the inner end of the side ring lies over the groove 35 or 52 and the sealing element is therefore radially compressed. As the tire is inflated, the side ring 31 or 47 moves outwardly to engage its split locking ring 34 or 51 and is positioned thereby with a permanent seal being effected.

To assemble the rim structure illustrated in Figure 4, the tire is moved laterally onto the rim base 57 sufficiently to expose the gutter 60. The sealing element 73 is then placed in the gutter 60 and preferably lubricated with a soap solution or other of the well known lubricants. The side ring 64 is then started laterally onto the base 57 to a position where the sealing element 73 can be moved from the gutter into the groove 69 of the side ring 64. The side ring 64 is then moved laterally over the base 57 until the gutter 60 is exposed and at the same time the sealing element 73 is being rolled over the base by the groove 69. The lock ring 68 is then snapped into position in the gutter 60. The tire is then inflated which moves the side ring 64 laterally into engagement with the split ring 68 and distorts the seal 73 to effect a permanent airtight seal.

In order to remove a tire from any of the described rim structures, it is only necessary to reverse the steps of assembly as previously described. After the rim assembly has been in service, it is advisable to replace the sealing element if the rim is disassembled to eliminate any unnecessary possibility of the old sealing element not forming a proper seal.

From the foregoing it is apparent that the rim structures described provide a simple and effective single seal that not only seals the joints of the rim structure but also the joint between the wheel disc and rim base.

While certain representative embodiments and details have been shown for the purpose of illustrating the invention, it will be apparent to those skilled in the art that various changes and modifications may be made without departing from the spirit or scope of the invention.

Having thus fully described this invention, what I claim and desire to secure by Letters Patent of the United States is:

1. A vehicle wheel including a multiple-piece rim and adapted for mounting a tubeless tire thereon, comprising a load-carrying disc member having an axially extending cylindrical portion adjacent its outer periphery; a first endless annular rim section having an integral bead seat along one side thereof, a gutter edge portion along the opposite side and an intermediate portion between the bead seat and gutter edge attached to said axially extending cylindrical portion of the disc member, the intermediate portion having a radially outwardly facing channel therein between the bead seat and the point of attachment to the disc member; a second endless annular rim section having an integral bead seat at one side thereof and an axially extending portion overlying the gutter and intermediate portion with a shoulder facing the gutter edge of said first rim section formed on the radial inner surface of the overlying portion, said shoulder and adjacent portion of said rim section cooperating with the channel in said first rim section to form a seal retaining chamber, open on at least one side; a resilient deformable sealing element in said chamber under radial and axial distortion, the distorted sealing element being in contact with the two rim sections only; and a split locking ring engaging said gutter edge of the first rim section and a portion of the second rim section to position said rim sections with respect to each other, said positioning of the rim section simultaneously distorting said sealing element in said chamber to prevent leakage of air between the adjacent portions of the first and second rim sections and around the points of attachment of the first rim section to the disc member.

2. A vehicle wheel including a multiple-piece rim and adapted for mounting a tubeless tire thereon comprising a load-carrying disc member having an axially extending cylindrical portion adjacent to the outer periphery; a first endless annular rim section having an integral bead seat along one side thereof, a gutter edge portion along the opposite side and an intermediate portion between the bead seat and gutter edge, the intermediate portion of said first rim section being attached to said axially extending cylindrical portion of said disc; a second endless annular rim section having an integral bead seat at one side thereof and including an axially extending portion overlying the gutter and intermediate portion; a seal retaining chamber having an axially facing opening on one side positioned between the bead seat of said first rim section and its point of attachment to the disc member, said chamber being formed by a radially facing channel in one of said rim sections and the radially adjacent portion of the other of said rim sections, the radially adjacent portion being recessed to form an axially facing shoulder adjoining the channel in the assembled position and providing a space between the rim sections adjacent the chamber on the side opposite the shoulder; a resilient deformable sealing element in said chamber under radial and axial distortion, the distorted sealing element in contact with the two rim sections only; and a split locking ring engaging said gutter edge of the first rim section and a portion of the rim section to position said rim sections with respect to each other, said positioning of the rim section simultaneously distorting said sealing element in said chamber to prevent leakage of air between the adjacent portions of the first and second rim sections and around the points of attachment of the first rim section to the disc member.

3. A vehicle wheel including a multiple-piece rim and adapted for mounting a tubeless tire thereon comprising a load-carrying disc member having an axially extending cylindrical portion adjacent to the outer periphery; a first endless annular rim section having an integral bead seat along one side thereof, a gutter edge portion along the opposite side and an intermediate portion between the bead seat and gutter edge, the intermediate portion of said first rim section being attached to said axially extending cylindrical portion of said disc; a second endless annular rim section having an integral bead seat at one side thereof and including an axially extending portion overlying the gutter and intermediate portion; a seal retaining chamber having an axially facing opening on one side positioned between the bead seat of said first rim section and its point of attachment to the disc member, said chamber being formed by a radially outwardly facing channel in said first rim section and the overlying portion of said second rim section, the overlying portion of said second rim section being recessed to form an axially facing shoulder overlying the channel in the assembled position and providing a space between the rim sections adjacent the chamber on the side opposite the shoulder; a resilient deformable sealing element in said chamber under radial and axial distortion, the distorted sealing element in contact with the two rim sections only; and a split locking ring engaging said gutter edge of the first rim section and a portion of the rim section to position said rim sections with respect to each other, said positioning of the rim section simultaneously distorting said sealing element in said chamber to prevent leakage of air between the adjacent portions of the first and second rim sections and around the points of attachment of the first rim section to the disc member.

4. A vehicle wheel including a multiple-piece rim and adapted for mounting a tubeless tire thereon comprising a load-carrying disc member having an axially extending cylindrical portion adjacent to the outer periphery; a first endless annular rim section having an integral bead seat alone one side thereof, a gutter edge portion along the opposite side and an intermediate portion between the bead seat and gutter edge, the intermediate portion of said first rim section being attached to said axially extending cylindrical portion of said disc; a second endless annular rim section having an integral bead seat at one side thereof and including an axially extending portion overlying the gutter and intermediate portion; a seal retaining chamber having an axially facing opening on one side positioned between the bead seat of said first rim section and its point of attachment to the disc member, said chamber being formed by a radially inwardly facing channel in said second rim section and the underlying portion of said first rim section, the underlying portion of said first rim section being recessed to form an axially facng shoulder underlying the channel in the assembled position and providing a space between the rim sections adjacent the chamber on the side opposite the shoulder; a resilient deformable sealing element in said chamber under radial and axial distortion, the distorted sealing element in contact with the two rim sections only; and a split locking ring engaging said gutter edge of the first rim section and a portion of the rim section to position said rim sections with respect to each other, said positioning of the rim section simultaneously distorting said sealing element in said chamber to prevent leakage of air between the adjacent portions of the first and second rim sections and around the points of attachment of the first rim section to the disc member.

References Cited in the file of this patent

FOREIGN PATENTS

| | | |
|---|---|---|
| 1,080,891 | France | June 2, 1954 |
| 1,098,290 | France | Mar. 2, 1955 |
| 725,767 | Great Britain | Mar. 9, 1955 |

UNITED STATES PATENT OFFICE

CERTIFICATE OF CORRECTION

Patent No. 2,810,419                                October 22, 1957

Alva W. Woodward

It is hereby certified that error appears in the printed specification of the above numbered patent requiring correction and that the said Letters Patent should read as corrected below.

Column 5, line 54, for "said" read -- side --; column 6, line 22, for "alone" read -- along --.

Signed and sealed this 3rd day of December 1957.

(SEAL)
Attest:

KARL H. AXLINE
Attesting Officer

ROBERT C. WATSON
Commissioner of Patents